July 7, 1970 D. E. WARNER ET AL 3,519,276

PHONOGRAPH CONTROL APPARATUS

Filed June 28, 1968 3 Sheets-Sheet 1

DONALD E. WARNER
RENE F. JANSEN
INVENTOR.

BY R. E. Geangue
ATTORNEY

DONALD E. WARNER
RENE F. JANSEN
INVENTOR.

BY R. E. Geauque
ATTORNEY

DONALD E. WARNER
RENE F. JANSEN
INVENTOR

BY R. S. [signature]
ATTORNEY

United States Patent Office 3,519,276 Patented July 7, 1970

3,519,276

PHONOGRAPH CONTROL APPARATUS

Donald E. Warner, North Hollywood, and René F. Jansen, Van Nuys, Calif., assignors to Audiotronics Corporation, North Hollywood, Calif., a corporation of California Filed June 28, 1968, Ser. No. 741,043
Int. Cl. G11b *19/26*
U.S. Cl. 274—1 9 Claims

ABSTRACT OF THE DISCLOSURE

An apparatus for stopping and reversing direction of a phonograph turntable comprising a linkage assembly which is capable of locating a first idler wheel in a first position in contact with both the turntable and a drive wheel, and is also capable of locating the first idler wheel in a second position with a second idler wheel between the drive wheel and first idler wheel thereby causing an opposite rotation of the turntable, and further is capable of locating the first idler wheel in no contact with the turntable while applying a brake to the turntable.

BACKGROUND OF THE INVENTION

Phonograph records are extremely common in present day society. Their most common use is in the field of entertainment, i.e. music or other type of entertainment is transcribed thereon and is played back by means of a turntable mechanism. Basically, a turntable mechanism includes an electric motor which rotates a phonograph record at a predetermined speed and an electric pick-up arm is placed upon the record which is capable of effecting the playing of the sound transcribed thereon. Turntable mechanisms, which are solely designed for the playing of entertainment, require only to rotate in a single direction. Further, there is no apparent need to ever stop the turntable once started except by stopping the input power to the turnable.

However, it has been found that phonograph records and therefore turntables can be of great advantage in other fields than entertainment. For example, as an educational device the phonograph record is of great value. Particularly, a student of language can use a phonograph record to listen to the correct pronunciation of words and phrases of a foreign language by one versed in that language. The main requirement to the learning of a language is repetition. If the student is having difficulty with a particular word or phrase, it is necessary to repeat such many times to implant the correct pronunciation in the student's mind.

Most major educational institutions which have a language department have a section of sound-proof booths, each of which have a turntable for the playing of records. The student, in the seclusion of the booth, may play a record of a particular language. However, if the common types of turntables are used, to repeat any portion of the record is difficult, as the turntables rotate in only one direction and cannot be stopped or reversed. The student could manually lift the pick-up arm and replace it on the record but this procedure is not too accurate for locating the arm at the exact desired position as modern records are cut at about one hundred lines per inch. Further, the removing and replacing of the arm can cause damage to the record.

To solve the aforementioned problem it is common to provide a turntable apparatus which can be reversed. To provide for repetition of a word or phrase the student activates a control knob which instantly reverses the record and then reactivating the knob to its original position when the student believes that sufficient reversal of direction has occurred. However, usually such reversal mechanisms are complex and costly. Also, if the student desires to just stop the record to ponder or repeat to himself a word or phrase, such is not possible. To stop turntables of the prior art, the entire unit must be turned off.

SUMMARY OF THE INVENTION

The turntable apparatus of this invention provides a means to instantly reverse a phonograph turntable. Further, the apparatus also includes an intermediate stop position in which the turntable is at rest. Also, a brake is included when the stop position is activated to prohibit additional inertial movement of the turntable.

Specifically, the device of this invention includes a first idler wheel which is capable of contact in a first position with a drive wheel and rotates the turntable in one direction. In a second position a second idler wheel is located between the drive wheel and the first idler wheel and causes the turntable to rotate in the reverse direction. Intermediate the first and second position locations on the position control knob, an instant stop position is provided. A portion of the mechanism for the stop position includes a braking element separate and spaced from the first and second idler wheels. This braking element is capable of contaction of the turntable and precludes further rotation thereof. This assists the student in relocating a particular portion of the record when such has just been played.

A simple and believed to be novel linkage assembly is provided to accomplish the desired movements of the first and second idler wheels and the braking element. However, it is conceivable that other similar linkage assemblies could be employed to accomplish the desired movements and it is applicant's intention that such linkage assemblies be construed to fall within the scope of this invention.

DESCRIPTION OF THE SHOWN EMBODIMENT

Figure 1:
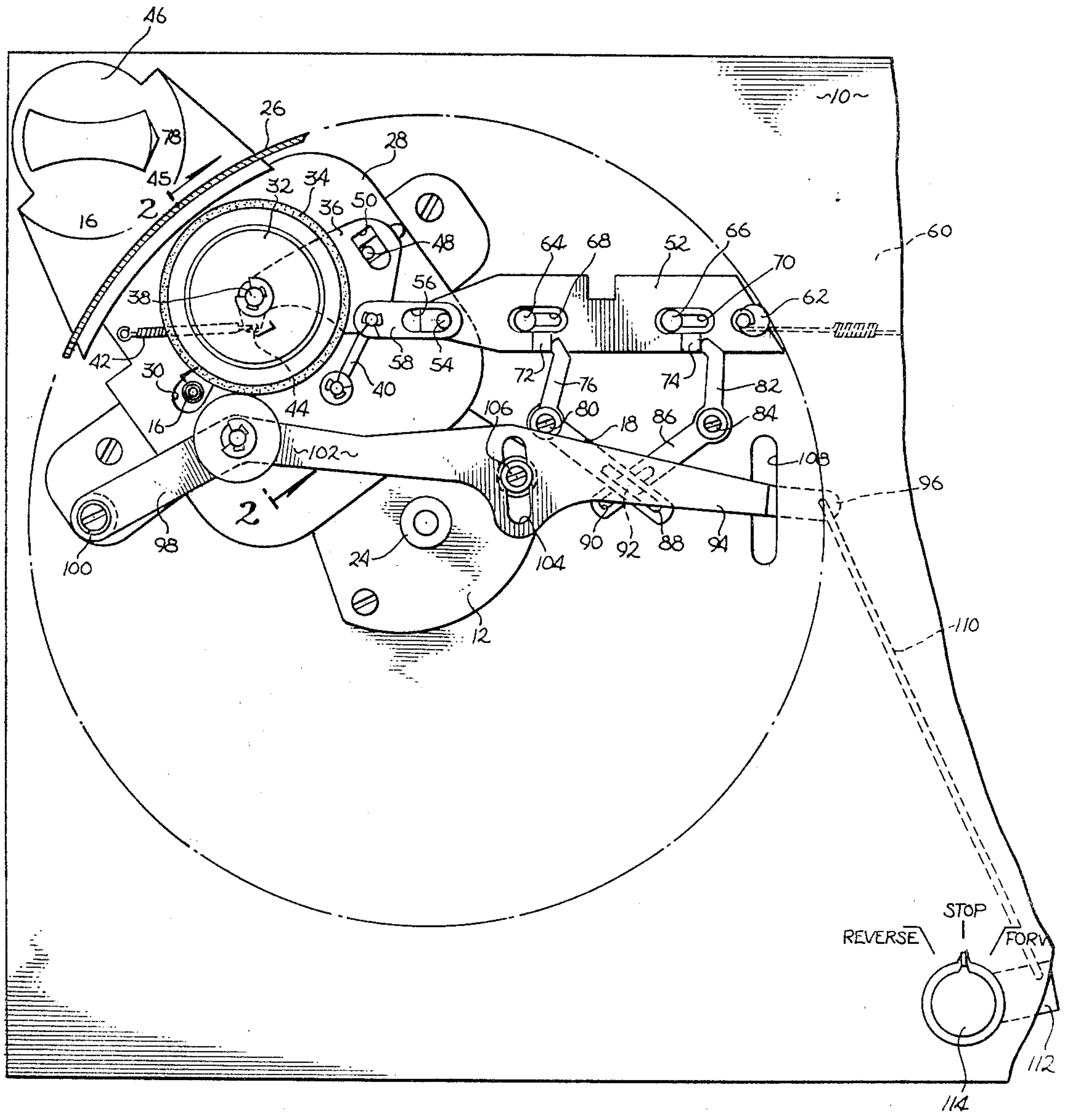
FIG. 1 is a plan view of the turntable mechanism of this invention showing the depicted linkage assembly in the intermediate position with the turntable at rest.
Figure 2:
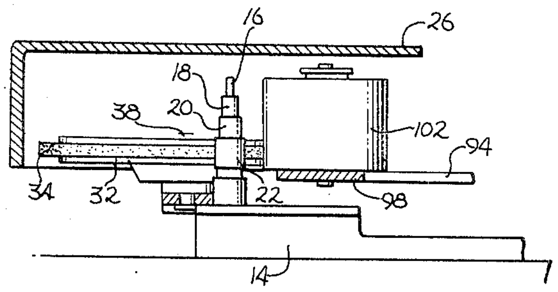
FIG. 2 is a fragmentary sectional side view taken along lines 2—2 of FIG. 1.

Referring particularly to the drawings, there is shown a phonograph record turntable base 10 upon which is mounted a turntable support stand 12. A drive motor 14 is supportingly secured to the base 10 upon its underside thereof with a drive shaft 16 extending through base 10 at a predetermined distance above the upper surface of base 10. Drive shaft 16 includes a plurality of different diameter surfaces 18, 20, and 22, the function of which will be described further on in the specification. The turntable support stand 12 carries a spindle 24 upon which the turntable 26 is rotatingly mounted. Upon base 10 is fixedly secured a support plate 28 in which is provided an aperture 30 to permit the extension of drive shaft 16 therethrough. A first idler wheel 32 is provided having a rubber rim 34. Wheel 32 is rotatingly supported upon floating plate 36 through a shaft 38. Mounting of the first idler wheel 32 is such that it can come in contact with the inside rim of turntable 26 and also contact drive shaft 16.

Floating plate 36 is supported with respect to plate 28 but in a spaced relationship with respect thereto. The main support for floating plate 36 is through arm 40, arm 40 being pivotally connected to floating plate 36 and to plate 28. A tension spring 42 is attached to extension 44 of floating plate 36 with spring 42 assisting in maintaining the position of floating plate 36 besides functioning to establish a firm driving connection between first idler wheel 32 and the turntable 26. Floating plate 36 is capable of being raised and lowered so that first idler wheel 32 may come into contact with one of the surfaces 18, 20 and 22. This arrangement permits the turntable to rotate at different speeds. The mechanism to accomplish this is not specifically shown but it is shown broadly as adjustment knob 46 and ratcheting post 48. An aperture 50 is provided within the floating plate 36 to facilitate its movement thereof, but, it is to be understood that ratcheting post 48 does not function as any support structure for the floating plate 36. The mechanism controlled by adjustment knob 46 to raise and lower idler wheel 32 does not form a part of applicants' invention and is only described herein to give the reader the intended environment in which the apparatus of applicants' invention is to be employed.

Figure 3:
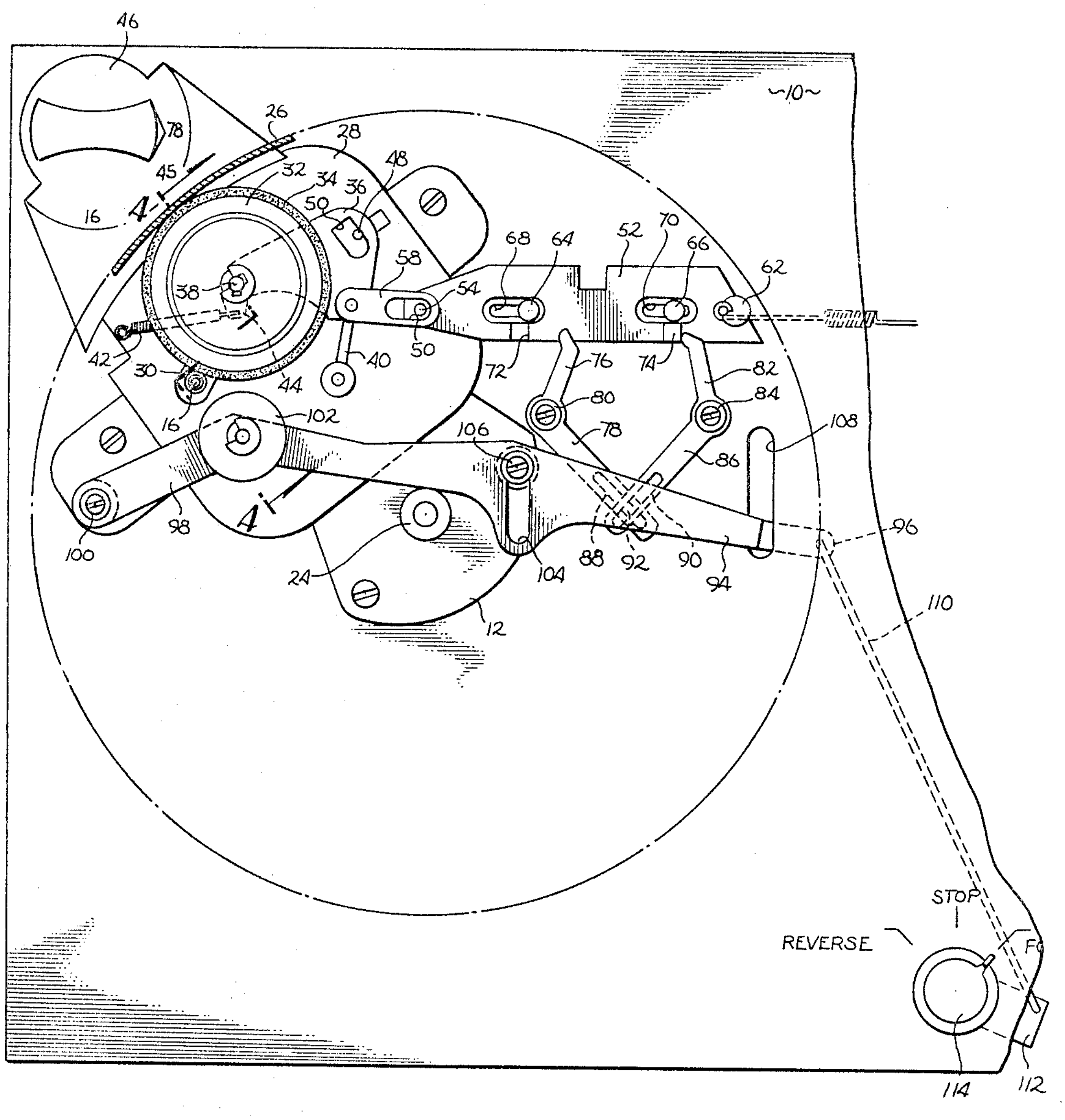
FIG. 3 is a plan view similar to FIG. 1 showing the depicted linkage assembly in the location causing the forward movement of the turntable.
Figure 4:
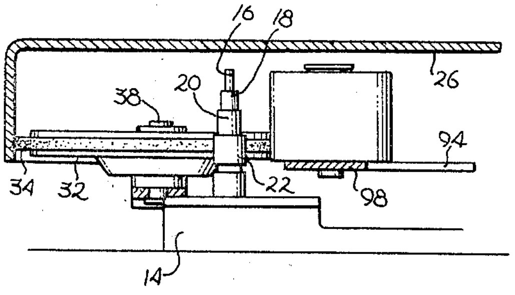
FIG. 4 is a fragmentary sectional side view taken along lines 4—4 of FIG. 3.
Figure 5:
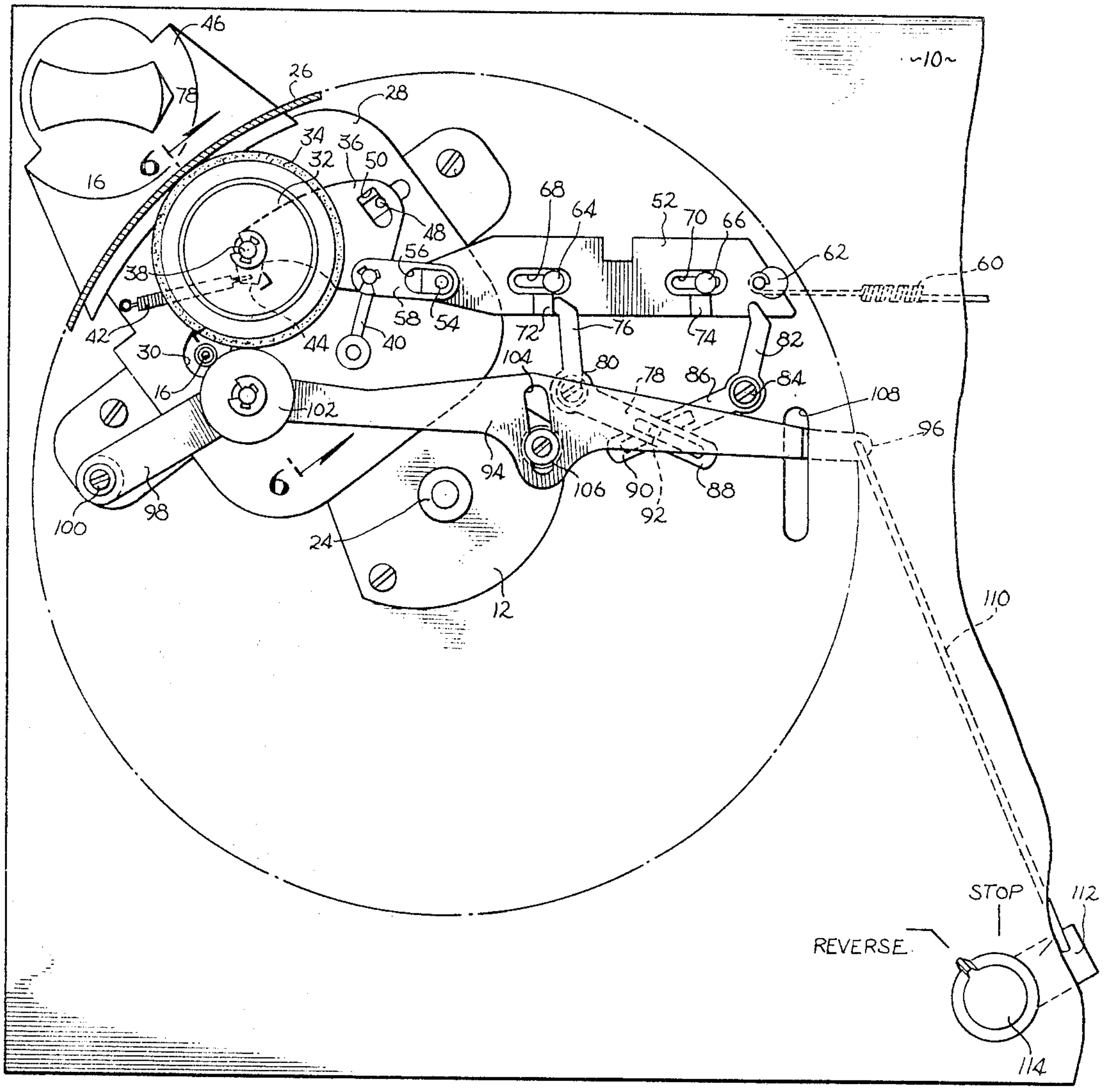
FIG. 5 is a plan view similar to FIG. 3 but showing the depicted linkage assembly in the location causing the turntable to rotate in a direction opposite to that of FIG. 3.
Figure 6:
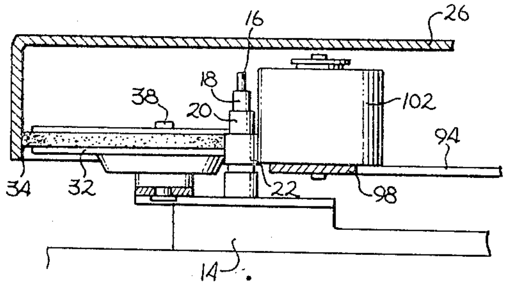
FIG. 6 is a fragmentary sectional side view taken along lines 6—6 of FIG. 5.

Floating plate 36 is capable of slight transverse movement due to movement of slide 52. Slide 52 includes an upstanding pin 54 which operates on a longitudinal slot 56 of a link 58 with link 58 being pivotally connected to floating plate 36. Slide 52 is capable of assuming a rearward position as shown in FIG. 1 and a forward position as shown in FIG. 3 or 5. When slide 52 is in the rearward position as shown in FIG. 1, the first idler wheel 32 is not in contact with either drive wheel 16 or turntable 26. Slide 52 is normally biased to this position by tension spring 60. It is to be noted that when slide 52 is in the rearward position as shown in FIG. 1, a brake 62 contacts the inside rim of turntable 26. The function of brake 62 will be explained further on in the specification.

Slide 52 is slidably mounted through posts 64 and 66 to turntable base 10. Longitudinal slots 68 and 70 respectively are provided as the limiting and guiding means for the movement of slide 52. Slide 52 also includes blocks 72 and 74. Block 72 is to be contacted by a contact arm 76 which is adjustably connected at 80 to scissor link 78. In a similar manner block 74 is to be contacted by contact arm 82 which is adjustably connected at 84 to a second scissor link 86. Adjustable connections 80 and 84 are provided to define the limits of movement of slide 52 as will become apparent from the following description.

Each of the first and second scissor links 78 and 86 include a longitudinal slot therein 88 and 90 respectively. Pin 92 extends within both of the slots 88 and 90 and is confined in movement thereby. Pin 92 is fixedly secured to a rotating link 94 having a first end portion 96 and a second end portion 98. Second end portion 98 is pivotally secured through pivotal connection 100 to turntable base 10. A second idler wheel 102 is rotatably attached to rotating link 94 and adjacent second end 98. The position of second idler wheel 102 is such that it is capable of contact with first idler wheel 32 and drive shaft 16. Rotating link 94 is guided in its pivotal movement by a slot 104 which cooperates with a guide pin 106 which is fixedly secured to the turntable base 10. The first end portion 96 of rotating link 94 passes through a slot 108 in turntable base 10 to the under surface of turntable base 10. A longitudinal rod member 110 is pivotally connected to the first end portion 96 and a similar connection is established with actuating element 112 of control knob 114. Knob 114 is pivotal between a forward position, a stopped position and a reversed position. It is important that the stopped position is intermediate the forward and reverse positions.

The operation of the apparatus of this invention is as follows: It will be assumed that the device of this invention is being employed by a student to facilitate the learning of a language and is playing a phonograph record of that language. As the student is listening to the record the turntable is operating and moving in the forward position. This position is shown in FIG. 3 of the drawing with second idler wheel 102 in the non-operating position and first idler wheel 32 in contact with both turntable 26 and drive shaft 16. If the student desires to reverse the record and replay a portion thereof, he merely actuates control knob 114 moving it to the reverse position and likewise past the intermediate stop position. As the knob 114 is turned to the stop position link 94 is rotated counterclockwise approximately one half its length of movement. Pin 92 actuates scissor links 78 and 86 causing contact arm 82 to rotate clockwise and contact arm 76 to rotate counterclockwise. This results in slide 52 assuming its rearward position with both the contact arms 76 and 82 just touching their respective blocks 72 and 74. Pin 54 of slide 52 has moved link 58 and caused floating plate 36 to be rotated slightly clockwise due to pivotal connecting arm 40. This movement is sufficient to remove first idler wheel from contact with turntable 26. It is noted that in this position, tension spring 42 tends to return first idler wheel 32 back into contact with turntable 26, but is prevented from doing so due to pin 54 of slide 52 which is held in that position by a stronger tension spring 60. Also, it is to be noted that upon the withdrawal of first idler wheel 32 from the turntable 26, brake 62 almost immediately contacts the turntable 26. This causes the turntable to quickly stop and prevent further forward inertial movement making it easier for the student to relocate a just previously played portion of the record. It is to be further noted that second idler wheel 102 and first idler wheel 32 are in a contacting relationship when the device is in the stopped position.

As the student proceeds to move the control knob 114 to the reverse position, rotating link 94 proceeds to move further counterclockwise until second idler wheel 102 comes into contacting relationship with drive shaft 16. Pin 92, through scissor link 86, rotates contacting arm 82 to an inoperative position and spaced from block 74. At the same time, pin 92 causes contact arm 76 to rotate counterclockwise through scissor link 78 and push against block 72. This causes movement of slide 52 and prevents pin 54 from holding back floating plate 36. Due to the action of tension spring 42, floating plate 36 is laterally moved toward the position which it had previously occupied in the forward position. However, prior to the first idler wheel 32 contacting the drive shaft 16 it comes into contact with second idler wheel 102. Also, the first idler wheel again contacts turntable 26. It is to be noted that second idler wheel 102 always comes in contact with surface 22 of the drive shaft 16. This causes the reverse movement to be at the maximum drive speed velocity. If a substantial portion of the record is being replayed, this decreases the time required to move the record in the reverse direction.

While the invention has been described in one embodiment, it is to be understood that the words which have been used are words of description rather than of limitation, and that changes may be made without departing from the true scope and spirit of this invention in its broader aspects.

We claim:

1. In a mechanism to operate a phonograph record turntable wherein there is provided an actuation means being capable of being moved to at least three separate and distinct positions, said positions being a forward position for said turntable, a reverse position which is opposite said forward position and an intermediate position in which said turntable is at rest, a linkage assembly comprising:

- a pivoting link having a pivot point with respect to a fixed surface, said pivoting link being directly operable by said actuation means, said pivoting link having a small idler wheel rotatably mounted thereon;
- a pair of scissor links;
- said pivoting link including structure to operate said pair of scissor links;
- a pair of contact arms, each one of said contact arms being associated with one of said scissor links;
- a pair of abutments, each one of said abutments being operatively associated with respect to each one of said contact arms;
- a slide being movable with respect to said fixed surface between a forward and rearward position, said pair of abutments being connected to said slide, each one of said pair of contact arms being capable of moving said slide to said forward position, said slide being under a constant bias toward said rearward position;
- a connecting link, said connecting link being directly movable by said slide;
- a plate, said connecting link being attached to said plate, said plate being supported by a laterally spaced arm, said arm being pivotally supported by said fixed surface, said plate being movable between a generally forward and a rearward position substantially in cooperation with said forward and rearward positions of said slide, said plate being under a constant bias toward said forward position;
- a rotating drive wheel;
- a large idler wheel, said large idler wheel being rotatingly supported by said plate, when said plate is in said forward position said large idler wheel is in contact with said turntable and also is in contact with either said drive wheel or said small idler wheel, when said large idler wheel is in contact with said small idler wheel said small idler wheel is also in contact with said drive wheel; and
- a motor, said motor imparting rotational movement to said drive wheel.

2. An apparatus as defined in claim 1 wherein: said slide includes a braking element, said braking element contacting said turntable when said linkage assembly is in said intermediate position.

3. An apparatus as defined in claim 2 wherein: each one of said contact arms being angularly adjustably connected to its respective scissor links.

4. An apparatus as defined in claim 3 wherein: said small idler wheel being mounted nearer said pivot point of said pivoting link than the said structure to operate said pair of scissor links.

5. An apparatus as defined in claim 4 wherein: said structure to operate said pair of scissor links comprises a pin, said pin operating in a slot in each of said scissor links.

6. An apparatus as defined in claim 5 wherein: said biasing means of said slide and said plate being provided by separate tension springs.

7. A mechanism for operating a phonograph record turntable comprising:

- linkage means movable into forward and reverse positions;
- a motor driven shaft;
- a first idler wheel movable into and out of engagement with said turntable by said linkage means;
- said linkage means moving said first idler wheel into engagement with said shaft and moving said idler wheel into engagement with said turntable to rotate said turntable by said first idler wheel in one direction when said linkage means is moved to one of said positions;
- a second idler wheel movable by said linkage means;
- said linkage means moving said second idler wheel into engagement with said shaft and with said first idler wheel and moving said first idler wheel into engagement with said turntable to rotate said turntable by said first idler wheel in the opposite direction when said linkage means is moved into the other of said positions.

8. A mechanism as defined in claim 7 wherein said linkage means has a stop position intermediate said forward and reverse positions;

- a brake means movable into and out of engagement with said turntable;
- said linkage means comprising link means for positioning said brake means in engagement with said turntable when said linkage means is in the stop position and out of engagement with said turntable when said linkage means is in the forward and reverse positions.

9. A mechanism as defined in claim 8 wherein said link means comprises two scissor links each pivoted at one end, the other end of each link being slotted;

- said linkage means comprising an actuating pin located in each of said slots;
- a contact arm attached to the opposite end of each of said links;
- said contact arms moving relative to one another upon movement of said linkage means to position said brake means.

References Cited

UNITED STATES PATENTS

| | | | |
|---|---|---|---|
| 3,118,679 | 1/1964 | Lyon | 274—9 |
| 3,069,171 | 12/1962 | Brobeck | 274—10 |

HARRY N. HAROIAN, Primary Examiner

U.S. Cl. X.R.

274—9, 39